United States Patent
Davies et al.

(10) Patent No.: US 6,601,475 B2
(45) Date of Patent: Aug. 5, 2003

(54) HARDFACED DRILL BIT STRUCTURES AND METHOD FOR MAKING SUCH STRUCTURES

(75) Inventors: Peter M. Davies, Ponca City, OK (US); Dennis Bond, Ponca City, OK (US); Hubert W. Penka, Jr., Ponca City, OK (US); Cary Roth, Ponca City, OK (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/918,745

(22) Filed: Jul. 31, 2001

(65) Prior Publication Data

US 2002/0035895 A1 Mar. 28, 2002

Related U.S. Application Data

(60) Provisional application No. 60/234,869, filed on Sep. 22, 2000.

(51) Int. Cl.$^7$ ............................................. E21B 10/52
(52) U.S. Cl. ....................................................... 76/108.2
(58) Field of Search ........................................ 76/108.2

(56) References Cited

U.S. PATENT DOCUMENTS

| | | | |
|---|---|---|---|
| 3,461,983 A | 8/1969 | Hudson et al. | 175/375 |
| 3,513,728 A | 5/1970 | Hudson et al. | 76/108 |
| 3,952,815 A | 4/1976 | Dysart | 175/374 |
| 4,396,077 A | 8/1983 | Radtke | 175/329 |
| 4,679,640 A * | 7/1987 | Crawford | 76/108.2 X |
| 5,291,807 A | 3/1994 | Vanderford et al. | 76/108.2 |
| 5,348,770 A | 9/1994 | Sievers et al. | 427/422 |

* cited by examiner

*Primary Examiner*—Douglas D. Watts
(74) *Attorney, Agent, or Firm*—Rosenthal & Osha L.L.P.

(57) ABSTRACT

A method is disclosed for forming a drill bit structure to which a cutting element is to be affixed. The method includes applying a layer of hardfacing material to a basic bit structure, removing the layer of hardfacing material in a location to which the cutting element is to be affixed, and forming an attachment structure at the location. In one embodiment, the removing is performed by electrode discharge machining. In one embodiment, the basic bit structure is a roller cone, and the cutting element is an insert adapted to be interference fit within a socket in the roller cone.

16 Claims, 3 Drawing Sheets

HARDFACED DRILL BIT STRUCTURES AND METHOD FOR MAKING SUCH STRUCTURES

CROSS-REFERENCE TO RELATED APPLICATIONS

This application claims priority from U.S. Provisional Application No. 60/234,869 filed on Sep. 22, 2000.

BACKGROUND OF INVENTION

1. Field of the Invention

The invention relates generally to the field of drill bits used to drill wellbores through earth formations. More specifically, the invention relates to hardfacing structures on such bits, and methods for applying hardfacing structures on these bits to reduce erosion of certain parts of a drill bit during wellbore drilling.

2. Description of the Related Art

Drill bits used to drill wellbores through earth formations generally are within one of two broad categories of bit types. One of the types of drill bits is known as "fixed cutter" bits, which generally include a bit body formed from steel or other high strength material, and a plurality of cutting elements disposed at selected positions about the bit body. The cutting elements may be formed from any one or combination of hard or superhard materials, including natural or synthetic diamond, boron nitride and tungsten carbide.

The other type of drill bits is known as "roller cone" bits, which include a bit body having one or more roller cones rotatably mounted to the bit body. The bit body is typically formed from steel or other high strength material. The roller cones are also typically formed from steel or other high strength material, and have a plurality of cutting elements disposed at selected positions about the cones. The cutting elements may be formed from the same base material as is the cone, as in so-called "milled tooth" bits. Other roller cone bits include cutting elements called "inserts" which are press (interference) fit into sockets formed into the cone material. The inserts may be made from tungsten carbide, natural or synthetic diamond, boron nitride, or any one or combination of hard or superhard materials.

It is known in the art to apply hardfacing to the base material from which the cones are formed in roller cone bits. The hardfacing can be applied in the form of special erosion protection inserts used in addition to the cutting elements. See, for example, U.S. Pat. No. 3,952,815 issued to Dysart. Another way known in the art to use hardfacing to protect a roller cone is described in U.S. Pat. No. 5,291,807 issued to Vanderford. The method in the Vanderford '807 patent includes marking the face of a roller cone by masking or etching, applying hardfacing material, such as tungsten carbide, in the form of a powder, and heating the cone to bond the hardfacing powder to the cone. U.S. Pat. Nos. 3,461,983 and 3,513,728 issued to Hudson includes drilling holes (the sockets) in the cone prior to hardface application, plugging the holes, and then applying the hardface using a heating process. After heating to apply the hardfacing material, the plugs are removed and the inserts are pressed into the previously drilled sockets.

U.S. Pat. No. 5,348,770 issued to Sievers discloses a method for applying hardfacing to a cone which uses high velocity oxygen fuel (HVOF) spraying after the cone is formed. Forming the cone includes drilling the sockets for the inserts.

U.S. Pat. No. 4,396,077 issued to Radtke discloses a method for applying hardfacing to a fixed cutter bit, which includes generating an electric arc and spraying the arc-heated hardfacing material on to a substantially completely assembled bit structure.

Generally, the prior art methods for applying hardfacing to drill bits, and to roller cones in particular, require forming the bit or cone structure to which the hardfacing is to be applied prior to applying the hardfacing. A limitation of the prior art methods, generally speaking, is that they heat the structure to which the hardfacing is applied, after making the structure to which cutting elements are attached. Such heating may reduce the structural integrity of the attachment of the cutting elements to the bit structure. What is needed is a method for creating a bit structure which provides for application of hardfacing prior to making an attachment of the cutting elements to the bit structure.

SUMMARY OF INVENTION

The invention is a method for forming a drill bit structure to which a cutting element is to be affixed. The method includes applying a layer of hardfacing material to a basic bit structure, removing the layer of hardfacing material in a location to which the cutting element is to be affixed, and forming an attachment structure at the location.

In one embodiment, the removing is performed by electrode discharge machining. In another embodiment, the removing is performed by high pressure water erosion.

In one embodiment, the basic bit structure is a roller cone, and the cutting element is an insert adapted to be interference fit within a socket in the roller cone.

In this specific embodiment, the removing of the hardfacing is limited to creating an aperture in the hardfacing such that subsequent processing can occur to produce the cutting element receiving socket.

Other aspects and advantages of the invention will be apparent from the following description and the appended claims.

DETAILED DESCRIPTION

Figure 1:
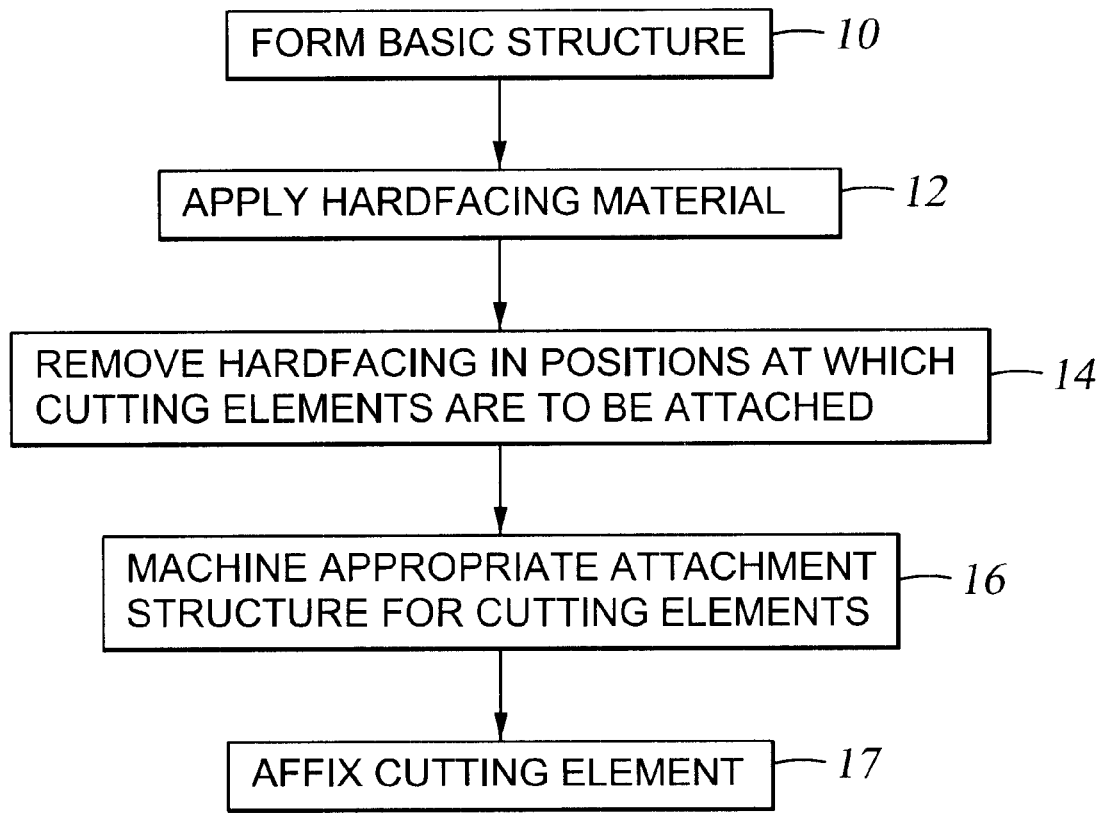
FIG. 1 is a flow chart of a process according to one embodiment of the invention.
Figure 2:
FIG. 2 shows one example of a bit structure at a location where a cutting element is to be attached.

A process for making a bit structure according to the invention is illustrated in a flow chart in FIG. 1. At 10, a basic bit structure is formed to which one or more cutting elements are to be affixed at selected positions on the bit structure. The term "basic bit structure" in this example is intended to include, for example, a roller cone which will be rotatably attached to a leg on a roller cone bit body, or, as another example, the body of a fixed cutter bit, such as a polycrystalline diamond compact (PDC) bit or a percussive hammer bit. Methods for forming the basic bit structure for each type of bit are well known in the art, and the choice of such methods is not intended to limit the invention. An example of a basic bit structure at this stage is shown in FIG. 2 at 18. The basic bit structure 18 is typically formed from a high strength material such as steel, to which hardface coating (hardfacing) will be applied to reduce susceptibility of the basic bit structure 18 to wear, while maintaining the structural integrity of the basic bit structure 18. It should be understood that the material actually used for the basic bit structure 18 is a matter of choice for the bit designer and is not intended to limit the scope of the invention.

Figure 3:
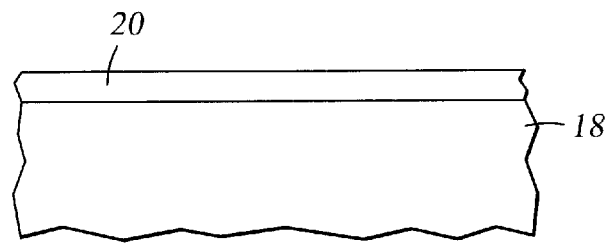
FIG. 3 shows the bit structure in FIG. 2 to which a layer of hardfacing material has been applied.

Still referring to FIG. 1, at 12 hardfacing is applied to the basic bit structure 18, including over the position at which a cutting element is to be affixed. This step in a method according to the invention is completely different from prior art methods of applying hardfacing to a basic bit structure. Such prior art methods typically included masking or otherwise controlling the locations on the basic bit structure to which hardfacing is to be applied, and also included having the basic bit structure include attachment structures (for the cutting elements to be affixed) already formed into the basic bit structure. The prior art methods include having the cutting elements already affixed to the attachment structures. The basic bit structure at this stage of the process is shown generally in FIG. 3 at 18, including the layer of hardfacing material applied thereon at 20.

Hardfacing materials which can be used in a basic bit structure made according to the invention include sintered or cast tungsten carbide, for example. Other wear resistant refractory materials known in the art may also be used for the hardfacing layer 20. In general, the hardfacing can be any material which can be metallurgically or mechanically bonded to the material selected for the basic bit structure (also referred to as the "substrate") and which is harder than the substrate material. When the basic bit structure 18 is a roller cone, a preferred thickness for the hardfacing layer 20 is about 0.030 to 0.060 inches (0.762 to 1.524 mm). Other thicknesses for the hardfacing may be used in other embodiments. The thickness selected for any particular basic bit structure depends on the drilling application and the abrasiveness of the formation to be drilled, among other factors.

The manner in which the hardfacing is applied to the substrate (the basic bit structure) is also a matter of choice for the bit designer, and may include, for example, HVOF spraying, high velocity air fuel (HVAF) spraying, welding, flame spray, plasma arc, plasma-transferred arc, sintering, furnace brazing, furnace fusing, pressure assisted centering, reaction bonding, among others. The technique actually used to apply the hardfacing should at least result in the formation of a mechanical bond to the substrate and, more preferably, should result in formation of a metallurgical bond to the substrate. Preferred processes for applying the hardfacing to create such a bond include plasma-transferred arc and flame spray. The substrate having the hardfacing layer applied thereto may at this time be heat treated to provide any preferred mechanical properties for the basic bit structure.

After the hardfacing layer 20 is applied, and referring back to FIG. 1, the hardfacing layer 20 is removed in the locations to which each of the cutting elements is to be affixed. This is shown at 14 in FIG. 1. In one embodiment, the hardfacing is removed by electrode discharge machining (EDM). Other processes for removing hardfacing may include high pressure water erosion, diamond drill, ceramic drill or boron nitride drill, or jig grinding/abrasive machining. EDM is preferred in this embodiment for its speed and ease of operation.

Figure 4:
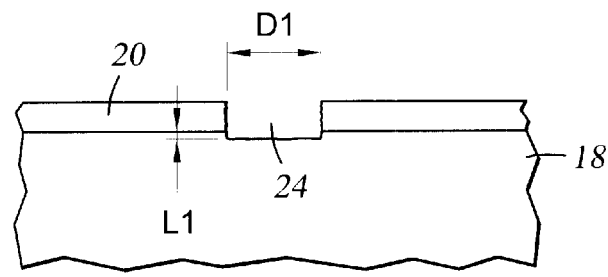
FIG. 4 shows the bit structure of FIG. 2 after the hardfacing has been removed in the location of the cutting element to be attached.

The basic bit structure, after the selective removal of the hardfacing, is shown in FIG. 4. An aperture 24 is shown in the hardfacing at the location to which the cutting element (not shown) is to be affixed. Preferably the aperture 24 has a diameter D1 of about 0.010 inches (0.254 mm) larger than the outside dimension of the cutting element (not shown), however, the aperture diameter D1 may be equal to the diameter of the cutting element and can be as large as 0.125 inches (3.175 mm) larger than the diameter of the cutting element. It is also preferable, where the cutting element (not shown) is to be affixed to the basic bit structure by interference fit, that a penetration depth L1 of the aperture 24 into the basic bit structure 18 be sufficient to expose the basic bit structure 18 for subsequent machining or processing. Interference fit, as is known in the art, is commonly used to affix insert cutting elements to roller cones on a roller cone bit. The penetration depth L1 is less important for bits in which the cutting element (not shown) is to be affixed to the basic bit structure 18 by brazing. Brazing is commonly used to attach cutting elements to the bit body in fixed cutter bits, for example.

Figure 6:
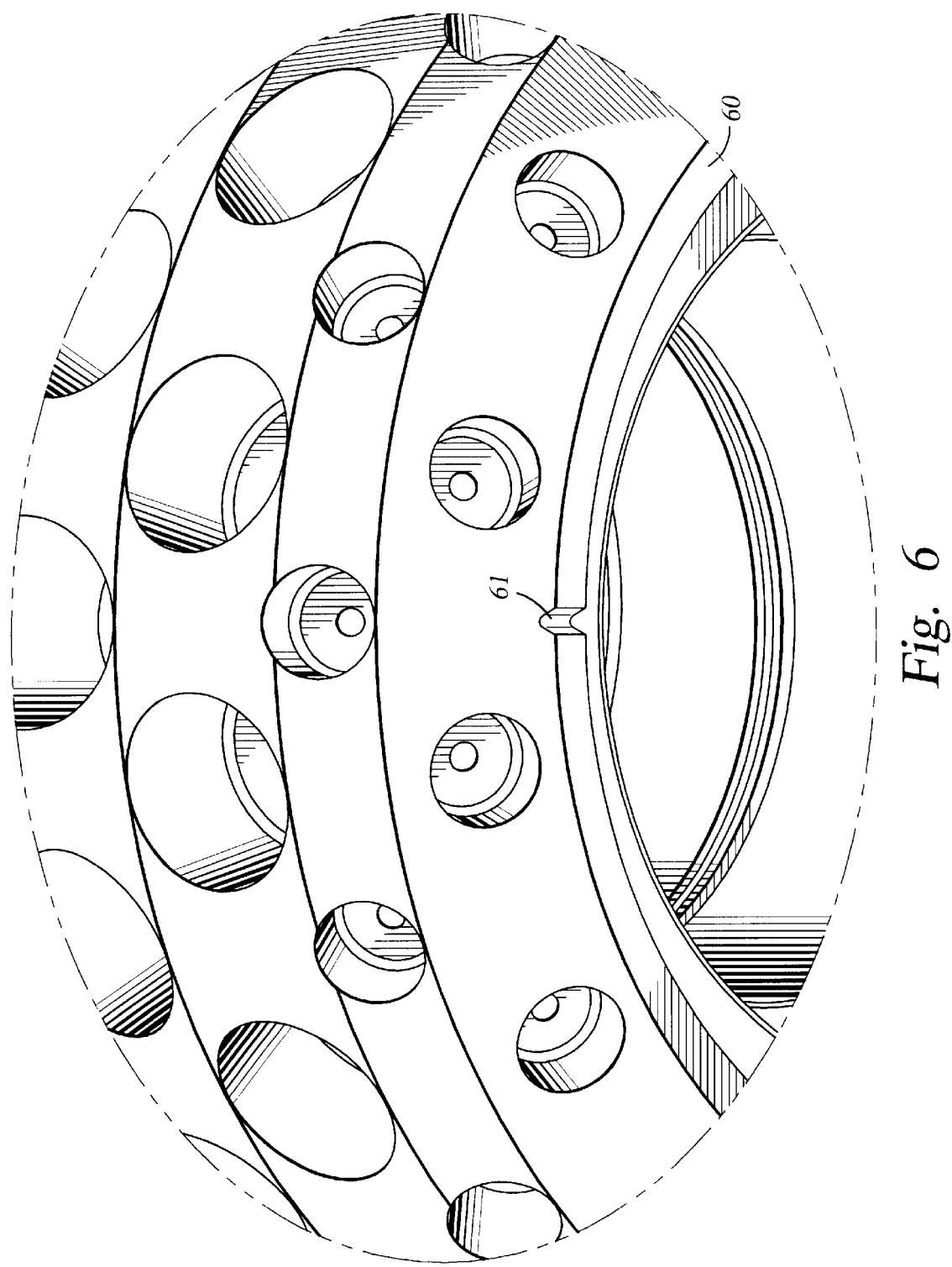
FIG. 6 shows an example of a roller cone having a timing mark thereon.

In one embodiment, shown in FIG. 6, it is desirable to include a reference indicator or "timing mark" 61 on the basic bit structure 60. The timing mark 61 is used in this embodiment to index a machine (not shown) used to perform the hardfacing removal to any form of machine used to drill sockets in the next step of the process according to the invention, so that the hardfacing removal will be performed in the precise location at which the socket is to be drilled.

Figure 5:
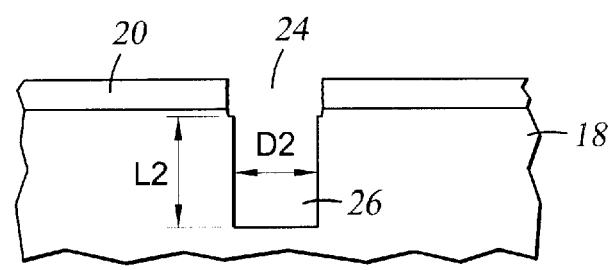
FIG. 5 shows the bit structure of FIG. 4 after an attachment structure has been formed into the bit structure.

After the hardfacing is removed, and once again referring to FIG. 1, an attachment structure, which in one embodiment is a socket on a roller cone, can be drilled or otherwise formed in the location to which the cutting element is to be affixed. This is shown at 16 in FIG. 1. The basic bit structure is shown at 18 in FIG. 5 after forming the socket 26. For insert-type cutting elements which are interference fit to a roller cone, for example, the socket 26 is preferably formed to a precise selected internal diameter D2, and formed to a precise depth L2 in the substrate. As previously explained, the degree of precision may not be as high for fixed cutter bits where the cutting elements (not shown) are to be brazed to the substrate.

When forming a basic bit structure such as a fixed cutter bit body, where, as previously explained, the dimensional control over the aperture (24 in FIG. 4) is less important than for interference fit sockets, an alternative embodiment of the invention may include removing the hardfacing layer, as in the previous embodiments, and continuing the operation which removes the hardfacing so as to create the attachment structure to which the cutting element (not shown) is to be affixed. Because fixed cutter bits typically have cutting elements affixed to the bit body by brazing or the like, forming attachment structures using nominally less dimensionally precise machining such as EDM or high pressure water erosion may form a sufficiently precise attachment structure without the need for a separate machining step.

A basic bit structure made according to the invention may have several advantages over similar bit structures made by prior art methods. First, the final structure includes hardfacing over a very substantial portion of the exposed surface area of the structure, without sacrificing the final mechanical properties of the structure or the bond between the structure and the hardfacing. Second, the cutting element attachment structure can be performed using conventional machining techniques, which may reduce the cost and complexity of manufacturing operations, while maintaining both the mechanical integrity of the overall bit structure and the degree of erosion resistance of the bit structure.

The invention has been described in terms of certain preferred embodiments. Those skilled in the art will readily devise other embodiments which do not depart from the spirit of the invention as described herein. Accordingly, the invention shall be limited in scope only by the attached claims.

What is claimed is:

1. A method for forming a basic drill bit structure to which a cutting element is to be affixed, comprising:

applying a layer of a superhard material to the basic bit structure to form a hardfacing layer;

removing the hardfacing layer in a location to which the cutting element is to be affixed; and forming an attachment structure at the location.

2. The method as defined in claim 1 wherein the removing of the hardfacing comprises electrode discharge machining.

3. The method as defined in claim 1 wherein the removing of the hardfacing comprises high pressure water erosion.

4. The method as defined in claim 1 wherein the removing of the hardfacing comprises abrasive machining.

5. The method as defined in claim 1 wherein the removing is limited to providing a minimum penetration depth that is sufficient to expose the basic bit structure for subsequent processing.

6. The method as defined in claim 5 wherein the subsequent processing comprises drilling a socket to form the attachment structure.

7. The method as defined in claim 1 wherein the removing is limited to creating an aperture having a diameter in a range between the cutting element diameter and 0.125 inches larger than the cutting element diameter.

8. The method as defined in claim 1 wherein the basic bit structure comprises a roller cone.

9. The method as defined in claim 1 wherein the cutting element comprises an insert adapted to have an interference fit in an aperture formed in the basic bit structure.

10. The method as defined in claim 1 wherein the basic bit structure comprises a fixed cutter bit body.

11. The method as defined in claim 10 wherein the cutting element comprises polycrystalline diamond.

12. The method as defined in claim 1 wherein the removing the hardfacing and the forming the attachment structure are combined in a single operation.

13. The method as defined in claim 1 wherein the forming the attachment structure is performed in a separate step comprising drilling.

14. The method as defined in claim 13 wherein the forming the attachment structure comprises drilling indexed by means of a timing mark.

15. The method as defined in claim 1 wherein the hardfacing is metallurgically bonded to the basic bit structure.

16. The method as defined in claim 1 wherein the hardfacing is mechanically bonded to the basic bit structure.

* * * * *